United States Patent Office 3,642,712
Patented Feb. 15, 1972

---

3,642,712
RETICULATED POLYMERS PREPARED FROM AZIRIDINE DERIVATIVES AND METHOD OF PREPARATION
Joerg Sambeth, Carouge, Geneva, and Friedrich Grundschober, Confignon, Geneva, Switzerland, assignors to Societe Rhodiaceta, Paris, France
No Drawing. Continuation-in-part of applications Ser. No. 552,388 and Ser. No. 552,403, both May 24, 1966. This application Oct. 30, 1968, Ser. No. 771,986
Claims priority, application Switzerland, May 28, 1965, 7,463/65, 7,464/65
Int. Cl. C08g 20/00
U.S. Cl. 260—78 UA                                      8 Claims

---

ABSTRACT OF THE DISCLOSURE

Novel aziridine derivatives of the formula:

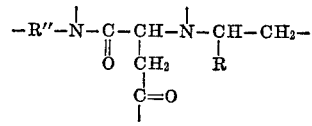

wherein R is hydrogen or methyl and $R_1$ is hydrogen, methyl, phenyl or a radical of the formula:

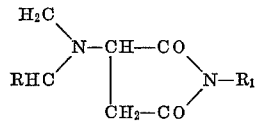

wherein R is as defined above and R'' is an alkylene radical of 2 to 12 carbon atoms or two phenylene residues bonded to one another by —$CH_2$—, —$SO_2$— or —O— are produced by reacting stoichiometric amounts of an unsaturated dicarboxylic acid imide of the formula:

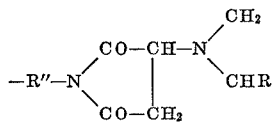

wherein $R_2$ is hydrogen, methyl, phenyl or a radical of the formula:

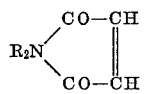

wherein R'' is as defined above with an aziridine of the formula:

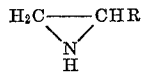

wherein R is as defined above at a temperature of 20 to 200° C. for 10 minutes to 10 hours in the presence or absence of a solvent.

Novel reticulated polymers are prepared from these novel aziridine derivatives by polymerizing said aziridine derivatives. The polymerization process comprises heating the aziridine derivative to a temperature between 50 to 200° C. and the reticulated polymer produced thereby is characterized by recurring structural units which are connected to one another through amide linkages and having the formula:

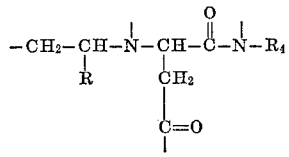

wherein R is as defined above and $R_4$ is hydrogen, methyl, phenyl or a pentavalent radical of the formula:

$$-R''-N-C-CH-N-CH-CH_2-$$
$$\quad\quad \overset{|}{O}\ \overset{|}{CH_2}\ \ \overset{|}{R}$$
$$\quad\quad\quad \overset{|}{C=O}$$

wherein R and R'' are as defined above; and when $R_4$ is said pentavalent radical it is attached to the rest of the recurring structural unit through the R'' portion thereof.

CROSS REFERENCE TO RELATED APPLICATIONS

This application is a continuation-in-part of applications Ser. No. 552,388 and 552,403, both filed May 24, 1966 and claiming a priority of May 28, 1965 both now abandoned.

DETAILED DESCRIPTION OF THE INVENTION

This invention relates to novel aziridine derivatives, a process for producing same, novel reticulated polymers based on said novel aziridine derivatives and processes for producing said polymers.

The polymers of the present invention are useful for producing molded objects and for sizing textiles as will be explained below.

The novel aziridine derivatives of the present invention are characterized by the formula:

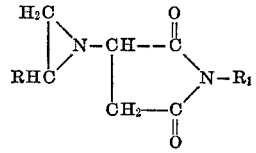

wherein R is hydrogen or methyl and $R_1$ is hydrogen, methyl, phenyl or a radical of the formula:

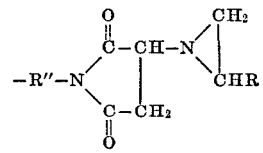

wherein R is as defined above and R'' is an alkylene radical of 2 to 12 carbon atoms or two phenylene residues bonded to one another by at least one of the following radicals:

—$CH_2$—, $SO_2$— and —O—

The process for making these aziridine derivatives comprises reacting, in a stoichiometric ratio at a temperature between 20 and 100° C. for a length of time ranging from 10 minutes to 10 hours, in the presence or absence of a solvent, at least one unsaturated dicarboxylic acid imide of the formula:

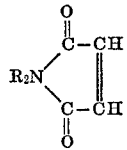

wherein $R_2$ is hydrogen, methyl, phenyl or a radical of the formula:

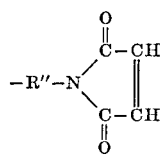

wherein $R''$ is as defined above with an aziridine of the formula:

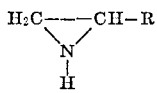

wherein R is as defined above.

Among the unsaturated dicarboxylic acid imides, use is preferably made of at least one of the following imides: maleimide, N - methyl-maleimide, N - phenyl-maleimide, N,N' - ethylene - bis - maleimide, N,N'-hexamthylene-bis-maleimide, N,N' - dodecamethylene-bis-maleimide, N, N' - p,p' - diphenylether-bis-maleimide, N,N'-p,p'-diphenylmethane-bis-maleimide, and N,N' - p,p' - diphenylsulphone-bis-maleimide.

As for the aziridine, use is preferably made of ethyleneimine or 2-methyl-ethylene-imine.

The reaction being highly exothermic, particularly when an imide is being used and even more so with maleimide, it can become very violent should the mixture of starting substances be over-heated. This can be avoided by employing an inert solvent having a low boiling point, such as for example ethyl ether, and by slowly adding, while strongly stirring, an aziridine solution to an imide solution. In the case of bis-imides, the reaction is less exothermic, so that the solvent may be dispensed with, in particular when use is made of a bis-imide which is soluble in the aziridine. A reactive mixture may also be prepared with an excess of aziridine, the reaction proceeding of course in a stoichiometric ratio.

The novel reticulated polymers of the present invention are characterized by the following recurring structural units which are connected to one another through amide linkages:

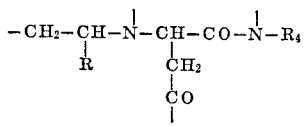

wherein R is hydrogen or methyl, and $R_4$ is hydrogen, methyl, phenyl or a pentavalent radical of the formula:

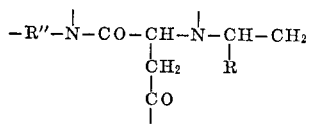

wherein R is as defined above and $R''$ is an alkylene radical of 2 to 12 carbon atoms or two phenylene residues bonded to one another by at least one of the following radicals: $-CH_2-$, $-SO_2-$ and $-O-$; and when $R_4$ is said pentavalent radical it is attached to the rest of the recurring structural unit through the $R''$ portion thereof.

The process for making these new reticulated polymers comprises heating at a temperature between 50 and 200° C. at least one novel aziridine derivative of the formula:

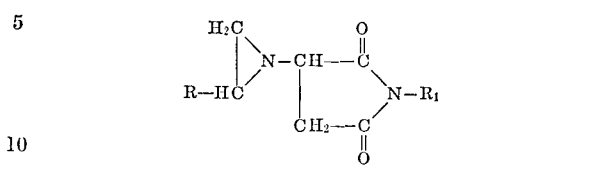

wherein R is hydrogen or methyl and $R_1$ is hydrogen, methyl, phenyl or a radical of the formula:

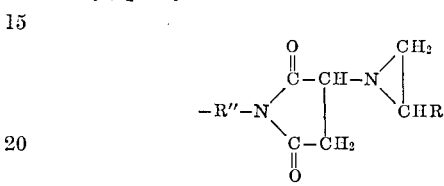

wherein R is as defined above and $R''$ is an alkylene radical of 2 to 12 carbon atoms or two phenylene residues bonded to one another by at least one of the following radicals: $-CH_2-$, $-SO_2-$ and $-O-$.

These novel aziridine derivatives are monomers produced by reacting an aziridine with an imide or bis-imide of an unsaturated dicarboxylic acid as disclosed immediately above.

Among the aziridine derivatives which can be used in the production of the reticulated polymers, there are, for example N - aziridyl-3-succinimide, N-methyl-aziridyl-3-succinimide, N-phenyl-(N-aziridyl-3-succinimide), N,N'-ethylene - bis - (N - aziridyl-3-succinimide), N,N'-hexamethylene - bis - (N-aziridyl-3-succinimide), N,N'-didecamethylene - bis - (N - aziridyl-3-succinimide), N,N'-p,p'-diphenylmethane - bis - (N - aziridyl-3-succinimide), and N,N' - hexamethylene - bis - (2'-methyl-N-aziridyl-3-succinimide).

The method according to this invention is well-suited for producing reticulated polymer molded objects. Depending upon the starting substance that is used, a molded object may be produced in any of three different ways:

(a) by polymerization in a mold at atmospheric pressure,
(b) by polymerization in a mold at a pressure greater than atmospheric, and
(c) by melting in a container to produce a substance suitable for casting which is then poured into a mold and polymerized.

The reticulated polymers obtained by polymerizing a starting material resulting from the reaction of an aziridine derivative with an unsaturated dicarboxylic acid imide has adhesive properties and can thus be used for assembling parts, in particular metal parts. In such a case, the starting material is placed between the parts requiring assembly to form a sandwich which is then heated to bring about polymerization in situ.

The polymers obtained from a starting substance resulting from the reaction of an aziridine derivative with an unsaturated dicarboxylic acid bis-imide may be used for sizing textiles since, during polymerization in the presence of textile fibers, the substance reacts with the reactive groups of the fibers.

The polymerization of the monomers can also be carried out in the presence of a catalyst, thereby accelerating the reaction at any given temperature. The one requirement of the catalyst is that it must be capable of providing acid groups, such as for instance dimethylsulphate, methyl-p-toluenesulphonate, ethyl-p-toluenesulphonate, and benzyl bromide.

The polymers thus obtained, i.e. by carrying out the reaction in the presence of a catalyst, comprise, in addition to the basic recurring structural unit indicated earlier, at least one other recurring structural unit of the formula:

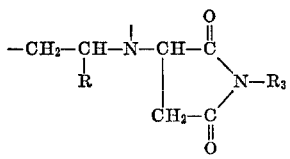

wherein R is hydrogen or methyl and $R_3$ is hydrogen, methyl, phenyl or a trivalent radical of the formula:

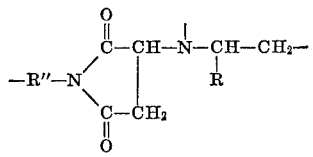

wherein R is hydrogen or methyl and R" is an alkylene radical of 2 to 12 carbon atoms or two phenylene residues bonded to one another by at least one of the following radicals: —$CH_2$—, —$SO_2$— and —O—; and when $R_3$ is said trivalent radical, it is attached to the rest of the polymer through the R" portion thereof.

The following examples illustrate the processes of the present invention and of these examples, numbers 1 through 10 illustrate the production of the novel aziridine derivatives and numbers 11 through 22 illustrate the production of the novel reticulated polymers.

EXAMPLE 1

A solution of 6.65 g. of ethylene-imine in 50 ml. of ethyl ether is slowly added, while strongly stirring, to a Florence flask under reflux containing a solution of 15 g. of maleimide in 100 ml. of ethyl ether and the reaction is left to occur at a temperature ranging from 25 to 30° C. There is obtained after about 15 minutes, by precipitation, 18 g. of a substance in the form of a white powder having a melting point which after recrystallization from acetone, is between 121 and 124° C. The elemental analysis (51.8% C, 5.69% H, 20.2% N), the molecular weight (calculated as 140 for $C_6H_8N_2O_2$ and found to be 141.5) and the infra-red spectrum of this substance show it to be N-aziridyl-3-succinimide.

EXAMPLE 2

A solution of 9.0 g. of 2-methyl-ethylene-imine in 50 ml. of ethyl ether is added to a Florence flask containing a solution of 15 g. of maleimide in 100 ml. ethyl ether and the reaction is left to occur at a temperature between 25 and 30° C. After some 30 minutes, there is obtained, by precipitation, 20 g. of a substance in the form of a white powder having a melting point between 98 and 104° C.

EXAMPLE 3

A mixture of 17.3 g. of N'-phenyl-maleimide and 4.5 g. of ethylene-imine is progressively heated to a temperature of 100° C., and stirred, in a Florence flask under reflux having a nitrogen atmosphere, which temperature is maintained for 4 hours. Evaporation is then carried out in vacuo until dry. The resultant product is N-phenyl-(N-aziridyl-3-succinimide).

EXAMPLE 4

A mixture of 27.6 g. of N,N'-hexamethylene-bis-maleimide and 9.0 g. of ethylene-imine is progressively heated to a temperature of 100° C., and stirred, in a Florence flask under reflux having an atmosphere of nitrogen, this temperature being maintained for 8 hours. Evaporation is then carried out in vacuo until dry. The resulting product is N,N'-hexamethylene-bis-(N-aziridyl-3-succinimide). It is viscous at ambient temperature but becomes fluid when heated.

EXAMPLE 5

A mixture of 36.0 g. of N,N'-dodecamethylene-bis-maleimide and 9.0 g. of ethylene-imine is progressively heated to a temperature of 100° C., and stirred, in a Florence flask under reflux having a nitrogen atmosphere, and this temperature is maintained for 8 hours. Evaporation is then carried out in vacuo until dry and the resulting product is N,N'-dodecamethylene-bis-(N-aziridyl - 3 - succinimide). The product is very viscous at ambient temperature but becomes more fluid when heated.

EXAMPLE 6

35.8 g. of maleic N,N'-p,p'-diphenylmethane-bis-imide are dissolved, while stirring, in 250 ml. of boiling benzene in a Florence flask under reflux, and 9.0 g. of ethylene-imine are added thereto. The solution is heated for 8 hours at 60° C. and evaporation is then carried out in vacuo until dry, leaving 44 g. of a solid substance. This substance is N,N'-diphenylmethane-bis-(N-aziridyl-3-succinimide) and has a melting point which after two recrystallizations from ethanol, is between 123 and 126° C.

EXAMPLE 7

4.4 g. of N,N'-ethylene-bis-maleimide are dissolved while stirring in 100 ml. of boiling benzene in a Florence flask under reflux, and 1.8 g. of ethylene-imine are added thereto. The solution is then heated for 8 hours at 60° C. whereupon evaporation is carried out in vacuo until dry to yield 6 g. of a solid substance. This substance is N,N'-ethylene-bis-(N-aziridyl-3-succinimide) and melts between 170 and 180° C.

EXAMPLE 8

A mixture of 27.6 g. of N,N'-hexamethylene-bis-maleimide and 12.0 g. of 2-methyl-ethylene-imine are progressively heated to a temperature of 100° C., and stirred in a Florence flask under reflux having a nitrogen atmosphere, which temperature is maintained for 10 hours. Evaporation is then carried out in vacuo until dry. The resulting product is N,N'-hexamethylene-bis-(2'-methyl-N-aziridyl-3-succinimide). It is viscous at ambient temperature but becomes more fluid when heated.

EXAMPLE 9

36 g. of N,N'-p,p'-diphenylether-bis-maleimide are dissolved while stirring in 300 ml. of boiling benzene contained in a Florence flask under reflux, and 9.0 g. of ethylene-imine are added thereto. The solution is then heated for 8 hours at a temperature of 60° C. whereupon evaporation is carried out in vacuo until dry. 44 g. of a solid substance are obtained. This substance is N,N'-p,p'-diphenylether-bis-(N-aziridyl-3-succinimide) and melts between 129 and 134° C.

EXAMPLE 10

41 g. of N,N'-p,p'-diphenylsulphone-bis-maleimide are dissolved while stirring in 300 ml. of boiling benzene contained in a Florence flask under reflux, and 9.0 g. of ethylene-imine are added thereto. The solution is then heated for 8 hours at a temperature of 60° C. whereupon evaporation is carried out under vacuo until dry. 46 g. of a solid substance are obtained. This substance is N,N'-p,p'-diphenylsulphone-bis(N-aziridyl-3-succinimide).

EXAMPLE 11

7 g. of N-aziridyl-3-succinimide are poured into a mold and heated at 120° C. for 24 hours. The resultant product is a molded reticulated polymer body having good mechanical properties. It is infusible but decomposes at about 300° C. It is insoluble in organic solvents but swells in boiling water.

EXAMPLE 12

10 g. of N-methyl-aziridyl-3-succinimide are poured into a mold and heated at a temperature of 110° C. for 5 hours. The resultant product is a molded reticulated resin body. It is infusible but decomposes at about 260° C. It is insoluble in organic solvents but swells in boiling water.

EXAMPLE 13

5 g. of N-phenyl-(N-aziridyl-3-succinimide) and 0.05 g. of ethyl-n-toluenesulphonate are poured into a container and this mixture is heated in a mold for 24 hours at a temperature of 140° C. A molded body is obtained which decomposes at 300° C.

EXAMPLE 14

A mixture of 5.3 g. of N,N'-ethylene-bis-(N-aziridyl-3-succinimide) and of 0.05 g. of methyl-p-toluenesulphonate is poured into a mold and heated for 1 hour at a temperature of 180° and a pressure of 100 kg./cm.$^2$. The resulting product is a molded reticulated resin body which is infusible and which is insoluble in organic solvents. Its Vicat softening point is at 240° C. and it decomposes at 320° C.

EXAMPLE 15

5 g. of N,N'-dodecamethylene-bis-(N-aziridyl-3-succinimide) are poured into a mold and heated for 64 hours at a temperature of 170° C. The resulting product, in the form of a molded body, has a dark color and is infusible and insoluble. It decomposes at 370° C.

EXAMPLE 16

5 g. of N,N'-hexamethylene-bis-(N-aziridyl-3-succinimide) and 0.05 g. of ethyl-p-toluenesulphonate are poured into a container and this mixture is heated at 60° C. to obtain a substance suitable for casting which is then poured into a mold and heated for 4 days at a temperature of 140° C. An infusible and insoluble molded body is obtained. Its Vicat softening point is at 157° C. and it decomposes at 320° C.

EXAMPLE 17

15 g. of N,N'-hexamethylene-bis(N-aziridyl-3-succinimide) and 0.3 g. of benzyl bromide are poured into a container and this mixture is heated at a temperature of 70° C. to obtain a product suitable for casting which is then poured into a mold and heated for 4 days at a temperature of 160° C. The resulting molded body is infusible and insoluble. Its Vicat softening point is at 125° C. and it decomposes at 250° C.

EXAMPLE 18

5 g. of N,N'-p,p'-diphenylmethane-bis-(N-aziridyl-3-succinimide) are poured into a mold and are heated for 1 hour at a temperature of 200° C. and a pressure of 100 kg./cm.$^2$. The resulting molded body is infusible and insoluble. Its Vicat point is at 260° C. and it decomposes at 300° C.

EXAMPLE 19

10 g. of N,N'-p,p'-diphenylmethane-bis-(N-aziridyl-3-succinimide) and 0.05 g. propyl-p-toluenesulphonate) are poured into a mold and this mixture is heated for 15 hours at a temperature of 120° C. and a pressure of 100 kg./cm.$^2$. The resulting body is infusible and insoluble. Its Vicat point is at 225° C. and it decomposes at 300° C.

EXAMPLE 20

5 g. of N,N'-p,p'-diphenylmethane-bis(N-aziridyl-3-succinimide) and 0.05 g. of methyl-p-toluenesulphonate are poured into a mold and heated for 15 hours at a temperature of 120° C. and a pressure of 100 kg./cm.$^2$. The resulting body is infusible and insoluble. Its Vicat point is at 220° C. and it decomposes at 300° C.

EXAMPLE 21

5 g. of N,N'-p,p'-diphenylether-bis-(N-aziridyl-3-succinimide) and 0.05 g. of methyl-p-toluenesulphonate are poured into a mold and heated for 15 hours at a temperature of 120° C. and a pressure of 100 kg./cm.$^2$. The resultant body is infusible and insoluble. Its Vicat softening point is at 220° C. and it decomposes at 300° C.

EXAMPLE 22

5 g. of N,N'-p,p'-diphenylsulphone-bis-(N-aziridyl-3-succinimide) and 0.05 g. of methyl-p-toluenesulphonate are poured into a mold and heated for 15 hours at a temperature of 120° C. and a pressure of 100 kg./cm.$^2$. The resultant body is infusible and insoluble. Its Vicat softening point is at 200° C. and it decomposes at 300° C.

What is claimed is:

1. A reticulated polymer consisting essentially of recurring structural units which are connected to one another through amide linkages and having the formula:

$$-CH_2-CH-N-CH-CO-N-R_4$$
$$\quad\ \ |\qquad\quad |$$
$$\quad\ \ R\qquad CH_2-CO-$$

wherein R is hydrogen or methyl and $R_4$ is hydrogen, methyl, phenyl or a pentavalent radical of the formula:

$$-R''-N-CO-CH-N-CH-CH_2$$
$$\qquad\ \ |\qquad\quad\ \ |$$
$$\quad\ -CO-CH_2\quad\ R$$

wherein R is as defined above and R'' is an alkylene radical of 2 to 12 carbon atoms or two phenylene radicals bonded to one another by at least one of the following radicals:

$$-CH_2-;\ -SO_2-\ \text{and}\ -O-$$

and where $R_4$ is said pentavalent radical it is attached to the rest of the recurring structural unit through the R'' portion thereof.

2. A reticulated polymer according to claim 1, further consisting essentially of at least one other recurring structural unit of the formula $$-CH_2-CH-N-CH-CO$$
$$\quad\ \ |\qquad\qquad\quad \diagdown$$
$$\quad\ \ R\qquad\qquad\qquad\ N-R_3$$
$$\qquad\qquad CH_2-CO\diagup$$

wherein R is as defined above and $R_3$ is hydrogen, methyl, phenyl or a trivalent radical of the formula $$\qquad\qquad CO-CH-N-CH-CH_2-$$
$$\qquad\quad\diagup\qquad\qquad\ |$$
$$-R''-N\qquad\qquad\qquad\ R$$
$$\qquad\quad\diagdown CO-CH_2$$

wherein R and R'' are as defined above and when $R_3$ is said trivalent radical, it is attached to the rest of the polymer through the R'' portion thereof.

3. A process for making a reticulated polymer, said process comprising heating, at a temperature between 50 and 200° C., at least one aziridine derivative of the formula $$\quad H_2C$$
$$\qquad\diagdown$$
$$\qquad\quad N-CH-CO$$
$$\qquad\diagup\qquad\qquad\ \diagdown$$
$$R-HC\qquad\qquad\qquad N-R_1$$
$$\qquad\qquad CH_2-CO\diagup$$

wherein R is hydrogen or methyl and $R_1$ is hydrogen, methyl, phenyl or a radical of the formula:

$$\qquad\qquad\qquad\ CH_2$$
$$\qquad\qquad\qquad\diagup$$
$$\qquad\quad CO-CH-N$$
$$\qquad\diagup\qquad\qquad\ |$$
$$-R''\qquad\qquad\qquad CH-R$$
$$\qquad\diagdown CO-CH_2\diagup$$

wherein R is as defined above and R'' is an alkylene radical of 2 to 12 carbon atoms or two phenylene radicals bonded to one another by one of the following radicals: $-CH_2-;\ -SO_2-\ \text{and}\ -O-$.

4. A method according to claim 3 which comprises heating at least one aziridine derivative selected from the group consisting of N-aziridyl-3-succinimide,
N-methyl-aziridyl-3-succinimide,
N-phenyl-(N-aziridyl-3-succinimide),
N,N'-ethylene-bis-(N-aziridyl-3-succinimide),
N,N'-hexamethylene-bis-(N-aziridyl-3-succinimide),
N,N'-dodecamethylene-bis-(N-aziridyl-3-succinimide),
N,N'-p,p'-diphenylmethane-bis-(N-aziridyl-3-succinimide), and
N,N'-hexamethylene-bis-(2'-methyl-N-aziridyl-3-succinimide).

5. A method according to claim 3, which comprises heating said aziridine derivative in the presence of a catalyst selected from the group consisting of dimethylsulphate, methyl-p-toluenesulphonate, ethyl - p - toluenesulphonate and benzyl bromide.

6. A method according to claim 3, which comprises heating said aziridine derivative in a mold at atmospheric pressure.

7. A method according to claim 3, which comprises heating said aziridine in a mold at a pressure greater than atmospheric pressure.

8. A method according to claim 3, which comprises heating said aziridine derivative at a temperature such as produces a substance suitable for casting, which substance is then poured into a mold in which is it polymerized.

References Cited
UNITED STATES PATENTS

| | | | |
|---|---|---|---|
| 2,626,931 | 1/1953 | Bestian | 260—2 |
| 3,036,974 | 5/1962 | Trieschmann et al. | 260—78 |
| 3,115,474 | 12/1963 | Smith | 260—78 |
| 3,115,482 | 12/1963 | Smith | 260—78 |
| 3,354,126 | 11/1967 | Ham et al. | 260—78 |

WILLIAM H. SHORT, Primary Examiner

L. L. LEE, Assistant Examiner

U.S. Cl. X.R.

260—47 CZ, 78 R